United States Patent
Conti et al.

(10) Patent No.: US 9,063,889 B2
(45) Date of Patent: Jun. 23, 2015

(54) SYSTEM AND METHOD FOR SECURE MODE FOR PROCESSORS AND MEMORIES ON MULTIPLE SEMICONDUCTOR DIES WITHIN A SINGLE SEMICONDUCTOR PACKAGE

(75) Inventors: Gregory Remy Philippe Conti, Saint Paul (FR); Jerome Laurent Azema, Villeneuve-Loubet (FR); Jerome Neanne, Nice (FR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 10/961,756

(22) Filed: Oct. 8, 2004

(65) Prior Publication Data

US 2006/0015947 A1     Jan. 19, 2006

(30) Foreign Application Priority Data

Jul. 1, 2004  (EP) .................................. 04291678

(51) Int. Cl.
*G06F 12/14* (2006.01)
*G06F 21/74* (2013.01)

(52) U.S. Cl.
CPC ............ *G06F 12/1433* (2013.01); *G06F 21/74* (2013.01)

(58) Field of Classification Search
USPC .............................. 711/163; 713/190; 726/23
See application file for complete search history.

(56) References Cited

U.S. PATENT DOCUMENTS

| | | | | |
|---|---|---|---|---|
| 5,014,191 A | * | 5/1991 | Padgaonkar et al. | 711/163 |
| 5,557,743 A | * | 9/1996 | Pombo et al. | 726/23 |
| 5,737,760 A | * | 4/1998 | Grimmer et al. | 711/163 |
| 5,825,878 A | * | 10/1998 | Takahashi et al. | 713/190 |
| 6,282,657 B1 | * | 8/2001 | Kaplan et al. | 726/1 |
| 7,013,398 B2 | * | 3/2006 | Zhao | 713/310 |
| 7,089,419 B2 | * | 8/2006 | Foster et al. | 713/166 |
| 7,120,771 B2 | * | 10/2006 | Dahan et al. | 711/163 |
| 7,237,081 B2 | * | 6/2007 | Dahan et al. | 711/163 |
| 2004/0123118 A1 | * | 6/2004 | Dahan et al. | 713/189 |
| 2005/0213766 A1 | * | 9/2005 | Goss | 380/277 |
| 2006/0004964 A1 | * | 1/2006 | Conti et al. | 711/136 |
| 2006/0005072 A1 | * | 1/2006 | Philippe Conti et al. | 714/5 |
| 2006/0059285 A1 | * | 3/2006 | Fischer et al. | 710/124 |
| 2006/0080580 A1 | * | 4/2006 | Conti et al. | 714/52 |
| 2006/0129848 A1 | * | 6/2006 | Paksoy et al. | 713/193 |
| 2006/0149918 A1 | * | 7/2006 | Rudelic et al. | 711/202 |

* cited by examiner

*Primary Examiner* — Brian Misiura
(74) *Attorney, Agent, or Firm* — Ronald O. Neerings; Frank D. Cimino

(57) ABSTRACT

A computing system comprising a processor having a first and second bus (the processor on a first semiconductor die mounted within a semiconductor package), a monitoring device coupled to both the first and second bus of the processor (the monitoring device on the first semiconductor die mounted within the semiconductor package), a memory coupled to the processor via the first bus (coupled to the monitoring device via a security signal, the memory on a second semiconductor die mounted within the semiconductor package), and a user interface external of the semiconductor package (the user interface coupled to the processor via the second data and instruction bus). The monitoring device checks one or both of the first and second busses to determine whether a secure mode entry sequence is delivered to the processor. The first bus and the security signal are only coupled to and accessible by devices within the semiconductor package.

24 Claims, 2 Drawing Sheets

SYSTEM AND METHOD FOR SECURE MODE FOR PROCESSORS AND MEMORIES ON MULTIPLE SEMICONDUCTOR DIES WITHIN A SINGLE SEMICONDUCTOR PACKAGE

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Technical Field

The present subject matter relates to increasing the amount of secure memory available to a microprocessor-based system on a chip (SoC). More particularly, the subject matter relates to providing additional secure memory within a single semiconductor package, for use by the SoC operating in a secure mode, while keeping the implementation of the secure mode of operation of the SoC and the secure memory self-contained within the single semiconductor package.

2. Background

Many microprocessors used in consumer electronic devices today are designed with two levels of privilege: one for the operating system (O/S); and the other for user software applications. In some microprocessor-based systems the two privilege levels do not provide adequate security, mainly due to the fact that effective implementation of the operating system privilege level (sometimes referred to as protected mode) relies on proper operation of the O/S software. Such reliance on the proper operation of the O/S software can leave a system potentially vulnerable to malicious programs such as computer viruses.

Some microprocessor-based systems have addressed this issue by implementing a third "secure" level of operation, implemented in hardware. This security hardware can block software access to at least some of the major system hardware components (e.g., memory, memory management units, and cache registers). The security hardware monitors the system for security violations and resets the entire system if any such violations are detected. Such capabilities are made possible in great part by the high levels of integration attainable on what is sometimes referred to as a "system on a chip" (SoC).

Because the major operational components necessary to implement a secure mode of operation on an SoC are contained within a single chip, it becomes possible to route the security control signals to the various system components and to selectively disable or enable those components as required without exposing the control signals to the outside world. It also becomes possible for the security hardware to monitor a wide variety of signals within and between the major system components in order to prevent, detect and react to security violations.

However, implementation of a secure mode on SoCs requires that memory used while the system is in secure mode be located within the chip in order to restrict access to its contents. This places significant limitations on the maximum size of the memory available for secure operation. Any increase in memory size means that the chip will either have less capabilities due to the lack of space for additional circuitry, or that the chip size will have to increase, adversely affecting both the cost and performance of the chip.

SUMMARY OF SOME OF THE PREFERRED EMBODIMENTS

The problems noted above are addressed in large part by a system and method for a secure mode for processors and memories on multiple semiconductor dies within a single semiconductor package. Some exemplary embodiments may be a processor core having a first data and instruction bus and a second data and instruction bus (the processor core on a first semiconductor die mounted within a semiconductor package), a monitoring device coupled to both the first data and instruction bus and the second data and instruction bus of the processor core (the monitoring device on the first semiconductor die mounted within the semiconductor package), a memory coupled to the processor core by way of the first data and instruction bus (coupled to the monitoring device by way of a security signal, the memory on a second semiconductor die mounted within the semiconductor package), and a user interface device external of the semiconductor package (the user interface device coupled to the processor core by way of the second data and instruction bus). The monitoring device checks one or both of the first and second data and instruction busses to determine whether a secure mode entry sequence is delivered to the processor core. The first data and instruction bus and the security signal are only coupled to and accessible by devices within the semiconductor package.

Other exemplary embodiments may be a semiconductor package comprising a processor core on a first semiconductor die mounted within the semiconductor package, a security state machine on the first semiconductor die (the security state machine coupled to the processor core by way of a first bus), and a memory on a second semiconductor die mounted within the semiconductor package (the memory coupled to the processor by way of the first bus). The security state machine monitors a second bus coupled to the processor core to determine whether a secure mode entry sequence is delivered to the processor core, and the first bus is only coupled to and accessible by devices within the semiconductor package.

Yet further exemplary embodiments may be a method comprising transferring instructions across a bus to a processor core on a first die (the first die within a semiconductor package monitoring the transferring of instructions to the processor core, the monitoring by a device on the first die), asserting a security signal by the device after a secure-mode entry instruction sequence is transferred to the processor core, and allowing access to a memory on a second die within the semiconductor package when the security signal is asserted.

Yet further exemplary embodiments may be a system comprising a means for processing software instructions, a means for monitoring software instructions transferred across a bus (the means for monitoring coupled to the bus, and the bus accessible by the means for processing, wherein the means for processing and the means for monitoring each reside on a first semiconductor die within a means for packaging semiconductor dies), and a means for storing data and instructions (coupled to the means for processing by way of the bus, wherein the means for storing resides on a second semiconductor die within the means for packaging). The means for monitoring selectively places the system in a secure mode of operation. The means for storing becomes available for access by software instructions executing on the means for processing only when the system is in the secure mode of operation.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
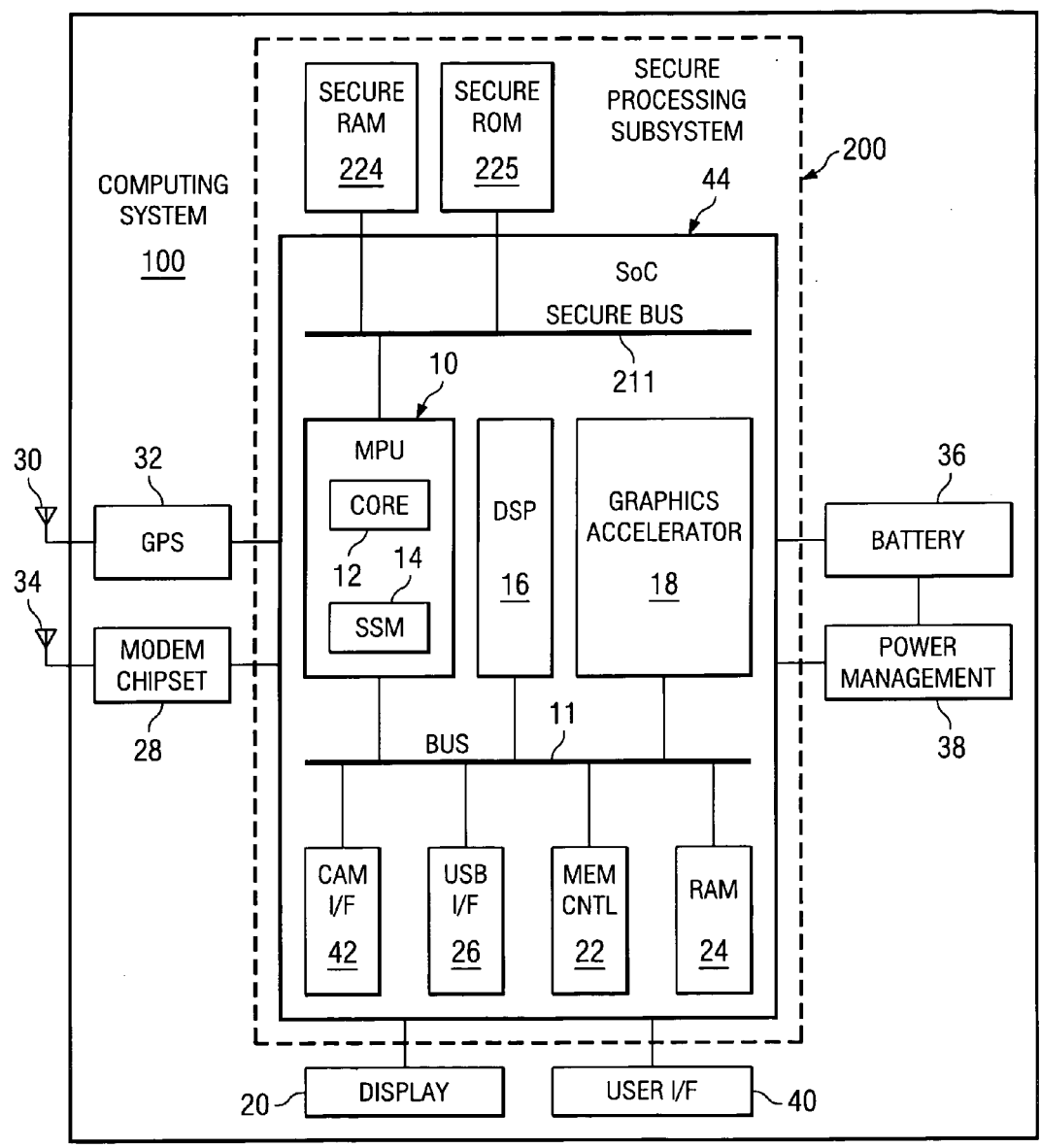
FIG. 1 illustrates a computing system constructed in accordance with at least some embodiments of the invention.

FIG. 1 shows a computing system 100 constructed in accordance with at least some embodiments of the invention. The computing system 100 may comprise a multiprocessing unit (MPU) 10 coupled to various other system components by way of a data and instruction bus (Bus) 11. The MPU 10 may comprise a processor core (Core) 12 that executes applications, possibly by having a plurality of processing pipelines. The MPU 10 may further comprise a security state machine (SSM) 14, which aids in allowing the computing system 100 to enter a secure mode for execution of secure software, and which further monitors operation during the secure mode to ensure secure operation.

The computing system 100 may further comprise a digital signal processor (DSP) 16 that aids the MPU 10 by performing task-specific computations, such as graphics manipulation and speech processing. A graphics accelerator 18 may couple both to the MPU 10 and DSP 16 by way of the Bus 11. The graphics accelerator 18 may perform necessary computations and translations of information to allow display of information, such as on display device 20. The computing system 100 may further comprise a memory controller (MEM CNTL) 22 coupled to random access memory (RAM) 24 by way of the Bus 11. The memory controller 22 may control access to and from the RAM 24 by any of the other system components such as the MPU 10, the DSP 16 and the graphics accelerator 18. The computing system 100 may also comprise secure random access memory (secure RAM) 224 and secure read-only memory (secure ROM) 225, which may couple to MPU 10 by way of secure data and instruction bus (Secure Bus) 211. The MPU 10 may access these secure memories while operating in a secure mode. The RAM 24 and secure RAM 224 may be any suitable random access memory, such as synchronous RAM or RAMBUS™-type RAM. The secure ROM 225 may be any suitable read-only memory, such as programmable ROMs (PROMs), erasable programmable ROMs (EPROMs), or electrically erasable programmable ROMs, (EEPROMs).

The computing system 100 may further comprise a USB interface (USB I/F) 26 coupled to the various system components by way of the Bus 11. The USB interface 26 may allow the computing system 100 to couple to and communicate with external devices.

The security state machine 14, preferably a hardware-based state machine, monitors system parameters and allows the secure mode of operation to initiate such that secure programs may execute from and access a portion of the RAM 24, the secure RAM 224, and/or the secure ROM 225. Having this secure mode, or third level of privilege, is valuable for any type of computer system, such as a laptop computer, a desktop computer, or a server in a bank of servers. However, in accordance with at least some embodiments of the invention, the computing system 100 may be a mobile computing system, e.g., a cellular telephone, personal digital assistant (PDA), text messaging system, and/or a computing device that combines the functionality of a messaging system, personal digital assistant and a cellular telephone. Thus, some embodiments may comprise a modem chipset 28 coupled to an external antenna 34 and/or a global positioning system (GPS) circuit 32 likewise coupled to an external antenna 30.

Because the computing system 100 in accordance with at least some embodiments is a mobile device, computing system 100 may also comprise a battery 36 providing power to the various processing elements, possibly controlled by a power management unit 38. A user may input data and/or messages into the computing system 100 by way of the user interface (User I/F) 40, such as a keyboard, keypad, or touch panel. Because many cellular telephones also comprise the capability of taking digital still and video pictures, in some embodiments the computing system 100 may comprise a camera interface (CAM I/F) 42 which may enable camera functionality, possibly by coupling the computing system 100 to a charge-coupled device (CCD) array (not shown) for capturing digital images.

In accordance with at least some embodiments of the invention, many of the components illustrated in FIG. 1, while possibly available as individual integrated circuits, are preferably integrated or constructed onto a single semiconductor die 44. Thus, the MPU 10, digital signal processor 16, memory controller 22 and RAM 24, along with some or all of the remaining components, are preferably integrated onto a single semiconductor die, and thus may be integrated into a computing device 100 as a single packaged component. Having multiple devices integrated onto the single semiconductor die 44, especially devices comprising a MPU 10 and RAM 24, may be referred to as a system-on-a-chip (SoC) or a megacell. In accordance with embodiments of the invention, a plurality of semiconductor dies may also be placed together within a single semiconductor package, allowing the SoC to be combined with other single semiconductor die components (e.g., additional processors, RAM and ROM semiconductor dies). Having multiple semiconductor dies integrated into a single semiconductor package may be referred to as "stacking."

Figure 2:
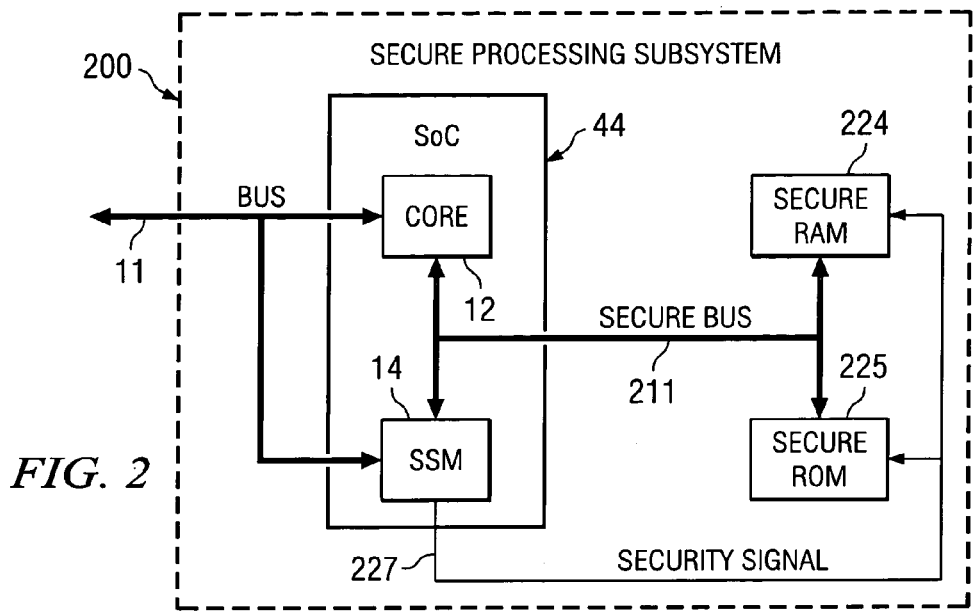
FIG. 2 illustrates a secure processing subsystem constructed in accordance with at least some embodiments of the invention.

FIG. 2 illustrates, in greater detail, the electrical interconnections among the components within the semiconductor package in accordance with embodiments of the invention. The security state machine 14 couples to and monitors both the Bus 11 and the secure Bus 211, and when a valid secure mode entry instruction sequence has been presented to the Core 12 on the Bus 11, the security state machine 14 asserts the security signal 227. Security signal 227 couples to the secure RAM 224 and the secure ROM 225, and, when asserted, allows secure code executing on the Core 12 to access the secure resources. Any attempt to access the address range associated with the secure resources by code executing on the Core 12 while the computing system 100 is in a non-secure mode may result in the security state machine 14 initiating a hardware reset of the entire computing system 100. Details of the design and methods of operation of a security state machine may be found in U.S. Pat. App. No. U.S. 2003/0140245 A1 titled, "Secure Mode for Processors Supporting MMU and Interrupts," assigned to the same assignee as the present specification, and incorporated by reference herein as if reproduced in full below.

Figure 3:
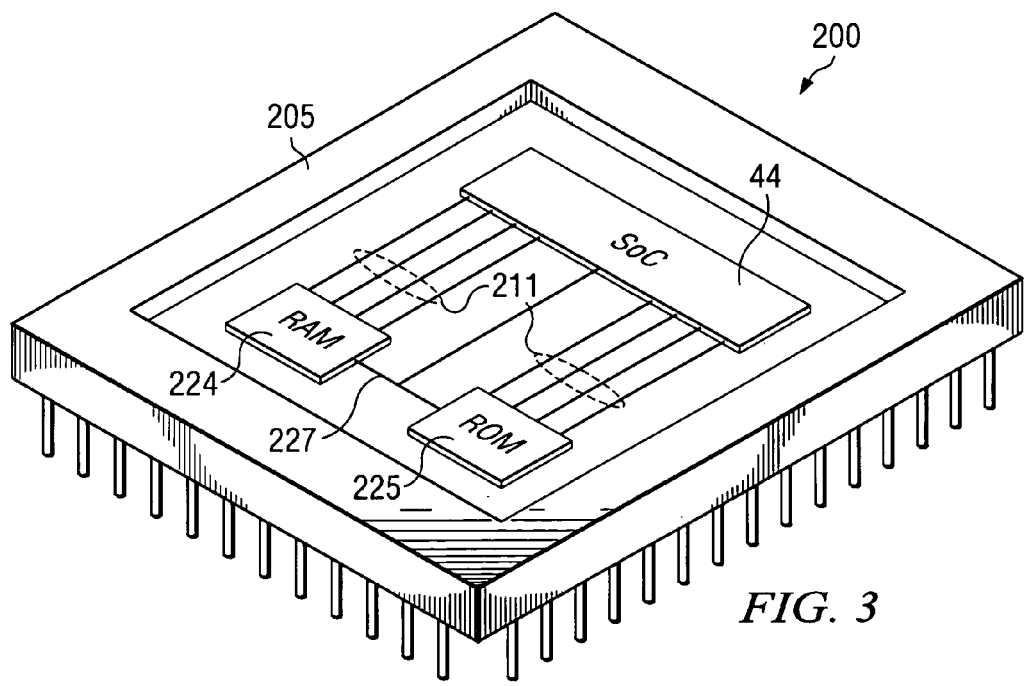
FIG. 3 illustrates an exemplary configuration of the components of FIG. 2 within a semiconductor package in accordance with at least some embodiments of the invention.

FIG. 3 illustrates that embodiments of the computing system 100 may combine with "stacked" memory components to create the secure processing subsystem 200 (see also FIGS. 1 and 2). The secure processing subsystem 200 comprises the SoC 44, the secure RAM 224 and the secure ROM 225, all physically mounted within the semiconductor package 205. The semiconductor package 205 may incorporate any of a variety of packaging technologies, such as flip-chip, pin grid array, plastic ball grid array, and leadless chip carrier technology. Referring again to FIG. 2, the Core 12 and the security state machine 14 are both integrated into the SoC 44, and it is these components that are coupled with each other and with the secure RAM 224 and the secure ROM 225 by the secure Bus 211 (also shown in FIG. 3).

As illustrated in FIG. 3, all of the components and signals necessary to implement the secure mode of operation may be wholly contained within the semiconductor package 205. In the embodiments shown, neither the secure Bus 211 nor the security signal 227 are routed outside of the semiconductor package 205. Thus, hardware components of the computing system 100 may only couple to and access the secure resources from within the semiconductor package 205. Having the security signal enable and disable the secure resources within the semiconductor package 205 adds an additional layer of security by preventing non-secure code executing on the Core 12 from accessing the secure resources.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computing system, comprising:
   a processor core and a monitoring device both coupled to a first bus and a second bus, all on a first semiconductor die mounted within a semiconductor package;
   a memory, external to the semiconductor die and internal to the semiconductor package, coupled to the processor core by way of the second bus, and access enabled by way of a security signal from the monitoring device, the memory on a second semiconductor die mounted within the semiconductor package;
   a user interface device external of the semiconductor package, the user interface device coupled to the processor core by way of the first bus; and
   wherein the monitoring device checks one or both of the first and second busses to determine whether a secure mode entry sequence is delivered to the processor core, and wherein the second bus and the security signal are coupled to and accessible only by devices within the semiconductor package.

2. The computing system as defined in claim 1, wherein the memory comprises a random access memory.

3. The computing system as defined in claim 1, wherein the memory comprises a read-only memory.

4. The computing system as defined in claim 1, wherein the security signal, when asserted, enables access to the memory.

5. The computing system as defined in claim 1, wherein the security signal, when de-asserted, prevents access to the memory.

6. A computing system, comprising:
   a processor core and a monitoring device both coupled to a first bus and a second bus, all on a first semiconductor die mounted within a semiconductor package;
   a memory, external to the semiconductor die and internal to the semiconductor package, coupled to the processor core by way of the second bus, and access enabled by way of a security signal from the monitoring device, the memory on a second semiconductor die mounted within the semiconductor package;
   a user interface device external of the semiconductor package, the user interface device coupled to the processor core by way of the first bus; and
   wherein the monitoring device checks one or both of the first and second busses to determine whether a secure mode entry sequence is delivered to the processor core, and wherein the second bus and the security signal are coupled to and accessible only by devices within the semiconductor package, and wherein the security signal, when asserted, enables access to a second memory external to the first semiconductor die and internal to the semiconductor package.

7. A semiconductor package, comprising:
   a processor core on a first semiconductor die mounted within the semiconductor package;
   a security state machine on the first semiconductor die, the security state machine coupled to the processor core by way of a first bus and a second bus;
   a memory on a second semiconductor die mounted within the semiconductor package, the memory coupled to the processor by way of the second bus; and
   wherein the security state machine monitors the first bus coupled to the processor core to determine whether a secure mode entry sequence is delivered to the processor core, and wherein the second bus is coupled to and accessible only by devices within the semiconductor package.

8. The semiconductor package as defined in claim 7, wherein the memory comprises a random access memory.

9. The semiconductor package as defined in claim 7, wherein the memory comprises a read-only memory.

10. The semiconductor package as defined in claim 7, wherein the memory couples to the security state machine by way of a security signal.

11. The semiconductor package as defined in claim 10, wherein activation of the security signal allows access to the memory.

12. The semiconductor package as defined in claim 10, wherein deactivation of the security signal blocks access to the memory.

13. A semiconductor package, comprising:
   a processor core on a first semiconductor die mounted within the semiconductor package;
   a security state machine on the first semiconductor die, the security state machine coupled to the processor core by way of a first bus and a second bus;
   a memory on a second semiconductor die mounted within the semiconductor package, the memory coupled to the processor and the security state machine by way of the second bus, wherein the memory is further coupled to receive a security signal from the security state machine; and wherein the security state machine monitors the first bus coupled to the processor core to determine whether a secure mode entry sequence is delivered to the processor core, and wherein the second bus is coupled to and accessible only by devices within the semiconductor package; and wherein activation of the security signal allows access to a second memory on a third semiconductor die mounted within the semiconductor package.

14. The semiconductor package as defined in claim 10, wherein the security signal only couples to and is accessible by devices within the semiconductor package.

15. A method, comprising:
transferring instructions across a bus to a processor core on a first die, the first die within a semiconductor package;
monitoring the transferring of instructions to the processor core, the monitoring by a device on the first die;
asserting a security signal by the device after a secure-mode entry instruction sequence is transferred to the processor core and detected by the device; and
allowing access to a memory on a second die within the semiconductor package when the security signal is asserted.

16. The method of claim 15, further comprising disallowing access to the memory when the security signal is not asserted.

17. The method of claim 15, further comprising resetting the processor core if an attempt is made to access the memory while the security signal is not asserted.

18. A method, comprising:
transferring instructions across a bus to a processor core on a first die, the first die within a semiconductor package;
monitoring the transferring of instructions to the processor core, the monitoring by a device on the first die;
asserting a security signal by the device after a secure-mode entry instruction sequence is transferred to the processor core and detected by the device;

allowing access to a memory on a second die within the semiconductor package when the security signal is asserted; and,
allowing access to a memory on a third die within the semiconductor package when the security signal is asserted.

19. A computing system, comprising:
a means for processing software instructions;
a means for monitoring software instructions transferred across a bus, the means for monitoring coupled to the bus, and the bus accessible by the means for processing, wherein the means for processing and the means for monitoring each reside on a first semiconductor die within a means for packaging semiconductor dies; and
a means for storing data and instructions, coupled to the means for processing by way of the bus, wherein the means for storing resides on a second semiconductor die within the means for packaging;
wherein the means for monitoring selectively places the system in a secure mode of operation, and wherein the means for storing becomes available for access by software instructions executing on the means for processing only when the system is in the secure mode of operation.

20. The computing system of claim 19, wherein the means for monitoring places the system in the secure mode of operation upon detecting an entry instruction sequence transferred to the means for processing.

21. The computing system of claim 19, wherein assertion of the security signal by the means for monitoring places the system in a secure mode of operation.

22. The computing system as defined in claim 1, wherein the first bus is a data and instruction bus and the second bus is a data and instruction bus.

23. The semiconductor package as defined in claim 7, wherein the memory is directly coupled to the security state machine.

24. The semiconductor package as defined in claim 23, wherein the security state machine is directly coupled to the processor core.

* * * * *